(12) United States Patent  
Lynch

(10) Patent No.: US 9,335,839 B1
(45) Date of Patent: May 10, 2016

(54) GRAPHIC ARTISTIC TABLET COMPUTER

(71) Applicant: Clive Lynch, Boston, MA (US)

(72) Inventor: Clive Lynch, Boston, MA (US)

( * ) Notice: Subject to any disclaimer, the term of this patent is extended or adjusted under 35 U.S.C. 154(b) by 101 days.

(21) Appl. No.: 14/247,517

(22) Filed: Apr. 8, 2014

(51) Int. Cl.
*G06F 1/16* (2006.01)
*G06F 3/0354* (2013.01)
*G06F 3/041* (2006.01)

(52) U.S. Cl.
CPC .......... *G06F 3/03545* (2013.01); *G06F 1/1626* (2013.01); *G06F 3/041* (2013.01)

(58) Field of Classification Search
CPC ....... G06F 1/1616; G06F 1/163; G06F 1/181; G06F 1/1601; G06F 3/03545; G06F 3/041; G06F 1/1626
USPC ............. 361/679.01, 679.02, 679.21, 679.22, 361/679.26, 679.27, 679.03, 679.3, 679.56, 361/679.59
See application file for complete search history.

(56) References Cited

U.S. PATENT DOCUMENTS

| | | | |
|---|---|---|---|
| 5,231,381 A | 7/1993 | Duwaer | |
| D352,279 S | 11/1994 | Foy | |
| 5,528,266 A | 6/1996 | Arbeitman | |
| 5,889,237 A | 3/1999 | Makinwa | |
| 5,973,677 A | 10/1999 | Gibbons | |
| 6,016,248 A * | 1/2000 | Anzai | G06F 1/1626 248/463 |
| 6,388,870 B1 * | 5/2002 | Canova, Jr. | G06F 1/1626 312/223.2 |
| 6,801,211 B2 | 10/2004 | Forsline | |
| 7,116,316 B2 | 10/2006 | Jelinek | |
| 8,130,195 B2 | 3/2012 | Shelton | |
| 2008/0017713 A1 * | 1/2008 | Lapstun | G06F 1/1626 235/454 |
| 2009/0059497 A1 * | 3/2009 | Kuwahara | A63F 13/08 361/679.27 |
| 2010/0134964 A1 * | 6/2010 | Smith | B60R 11/0252 361/679.2 |
| 2011/0036965 A1 * | 2/2011 | Zhang | F16M 11/10 248/688 |
| 2012/0099261 A1 * | 4/2012 | Reber | G06F 1/1632 361/679.3 |
| 2012/0106042 A1 * | 5/2012 | Ashida | A63F 13/02 361/679.01 |
| 2012/0194679 A1 * | 8/2012 | Nehowig | G06F 1/1626 348/148 |
| 2015/0091841 A1 * | 4/2015 | Lewis | G06F 3/044 345/174 |

FOREIGN PATENT DOCUMENTS

| | | |
|---|---|---|
| CN | 102602200 | 6/2013 |
| WO | WO2013029083 | 3/2012 |

* cited by examiner

*Primary Examiner* — Hoa C Nguyen
*Assistant Examiner* — Sagar Shrestha

(57) ABSTRACT

The flat display assembly for producing artistic visual effects using a stylus includes a housing. A stand is operationally coupled to the housing. The stand is positionable on a support surface so the housing is retained in an upright position. A processor is coupled to the housing. An electronic memory is coupled to the housing and the processor. A display is coupled to the housing and the processor so the display is accessible to a user. A directional control is coupled to the housing and the processor. The directional control controls a cursor on the display. An actuator is coupled to the housing and the processor. A speaker is coupled to the housing and the processor so the speaker emits an audible sound. A stylus may be gripped by a user.

2 Claims, 4 Drawing Sheets

GRAPHIC ARTISTIC TABLET COMPUTER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of artistic visual effects creation systems, more specifically, stylus based artistic visual effects creation systems.

SUMMARY OF THE INVENTION

An embodiment of the disclosure meets the needs presented above by generally comprising a housing that may be positioned on a support surface. A stand is operationally coupled to the housing. The stand is positionable on the support surface so the housing is retained in an upright position. A processor is coupled to the housing. An electronic memory is coupled to the housing. The electronic memory is operationally coupled to the processor. A display is coupled to the housing so the display is accessible to a user. The display is operationally coupled to the processor. A directional control is coupled to the the processor. The directional control controls a cursor on the display. An actuator is coupled to the housing. The actuator is operationally coupled to the processor. A speaker is coupled to the housing. The speaker is operationally coupled to the processor so the speaker emits an audible sound. A stylus may be gripped by a user. The user writes on the display with the stylus so the user creates the artistic visual effects.

An object of the invention is to provide a device that is stylus based artistic visual effects creation system.

These together with additional objects, features and advantages of the stylus based artistic visual effects creation system will be readily apparent to those of ordinary skill in the art upon reading the following detailed description of presently preferred, but nonetheless illustrative, embodiments of the stylus based artistic visual effects creation system when taken in conjunction with the accompanying drawings.

In this respect, before explaining the current embodiments of the stylus based artistic visual effects creation system in detail, it is to be understood that the stylus based artistic visual effects creation system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of stylus based artistic visual effects creation system.

It is therefore important that the claims be regarded as including such equivalent construction insofar as they do not depart from the spirit and scope of stylus based artistic visual effects creation system. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
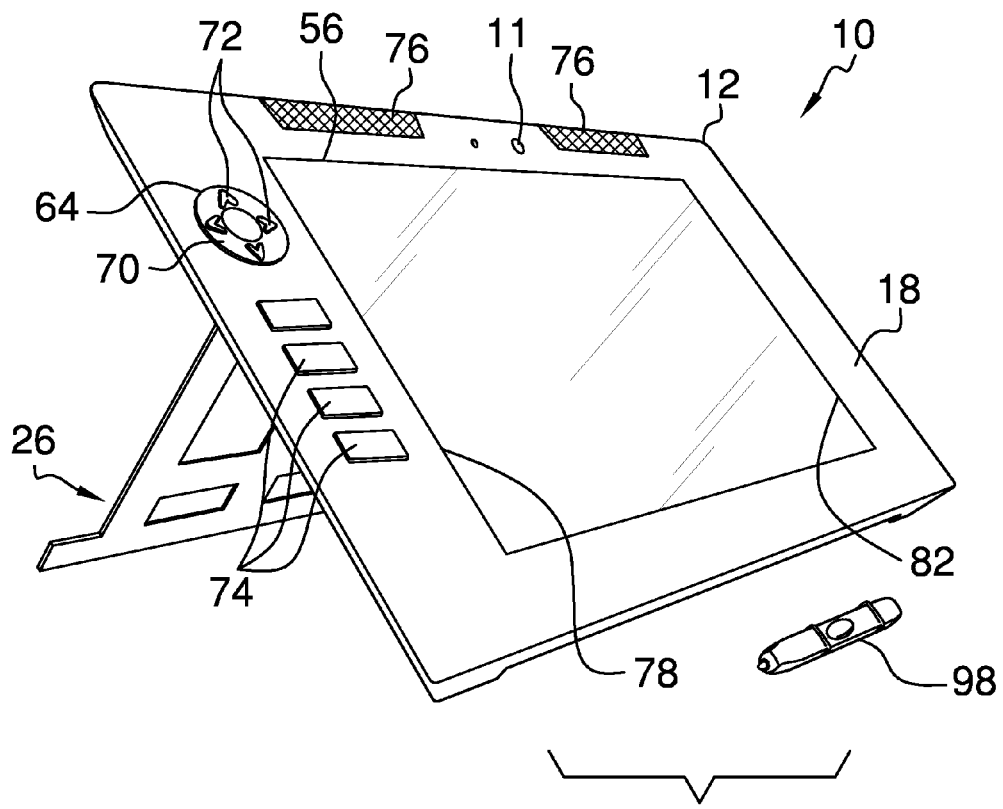
FIG. 1 is a front perspective view of a flat display assembly according to an embodiment of the disclosure.
Figure 2:
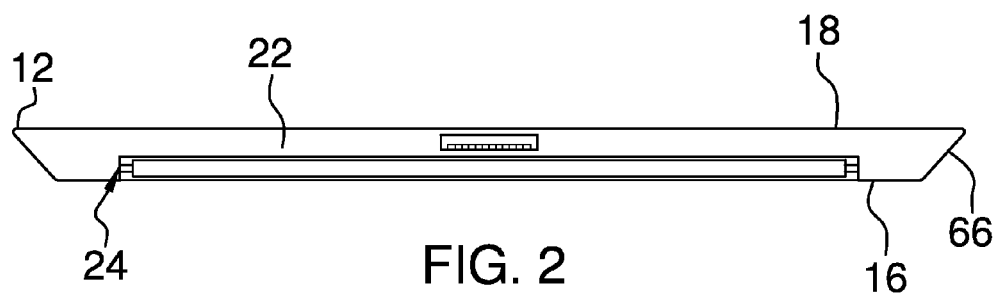
FIG. 2 is a bottom view of an embodiment of the disclosure.
Figure 3:
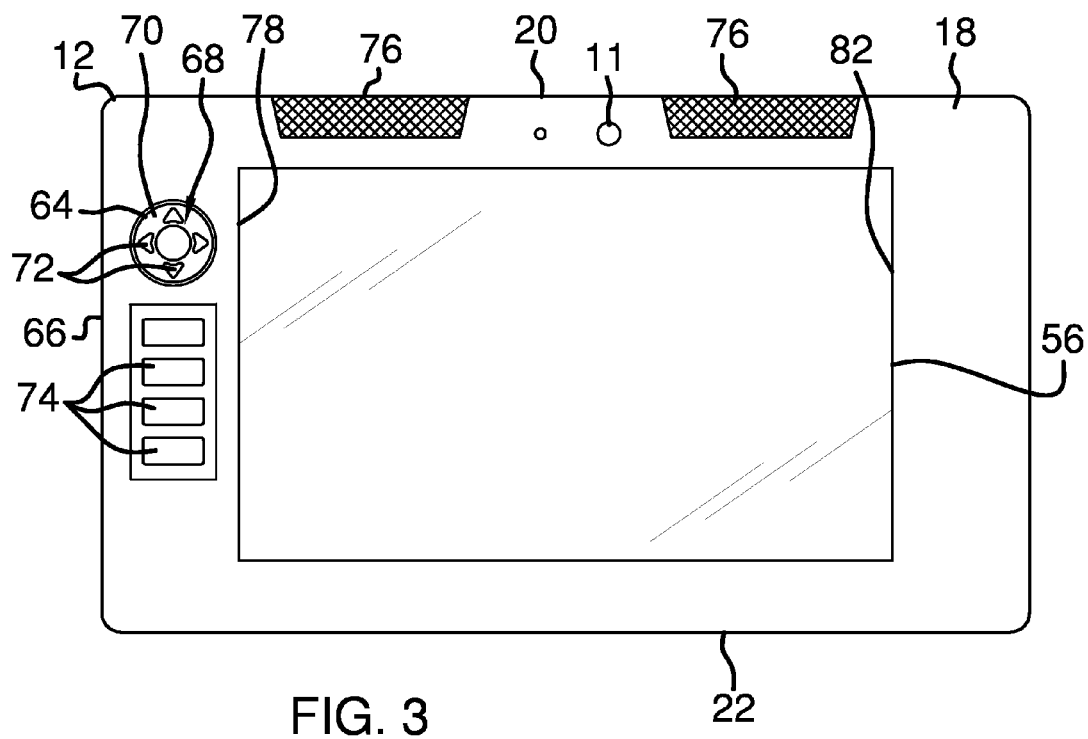
FIG. 3 is a front view of an embodiment of the disclosure.
Figure 4:
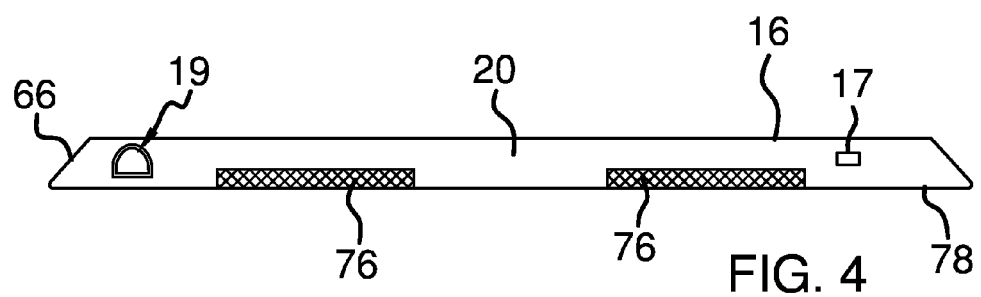
FIG. 4 is a top view of an embodiment of the disclosure.
Figure 5:
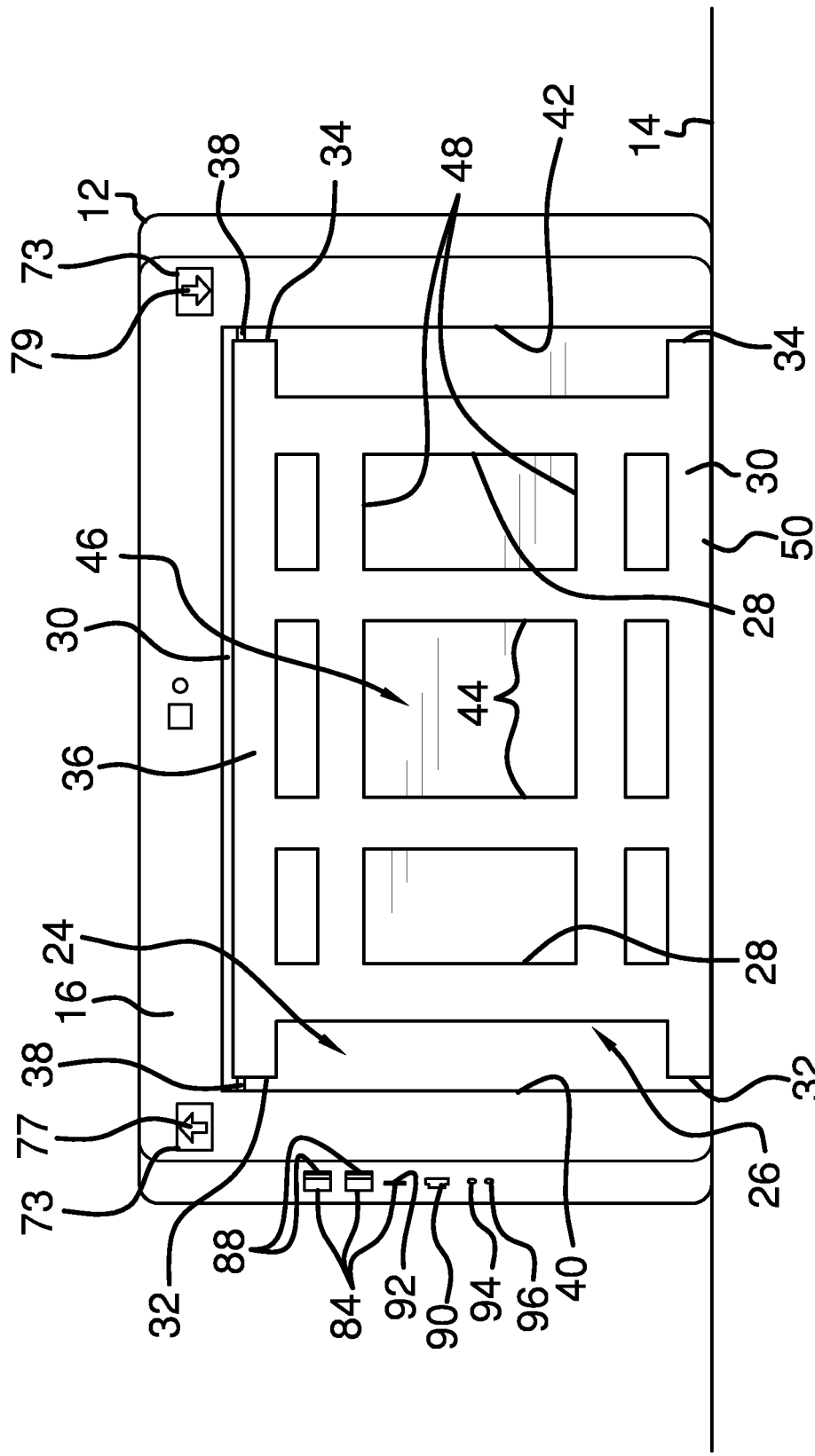
FIG. 5 is a back view of an embodiment of the disclosure.
Figure 6:
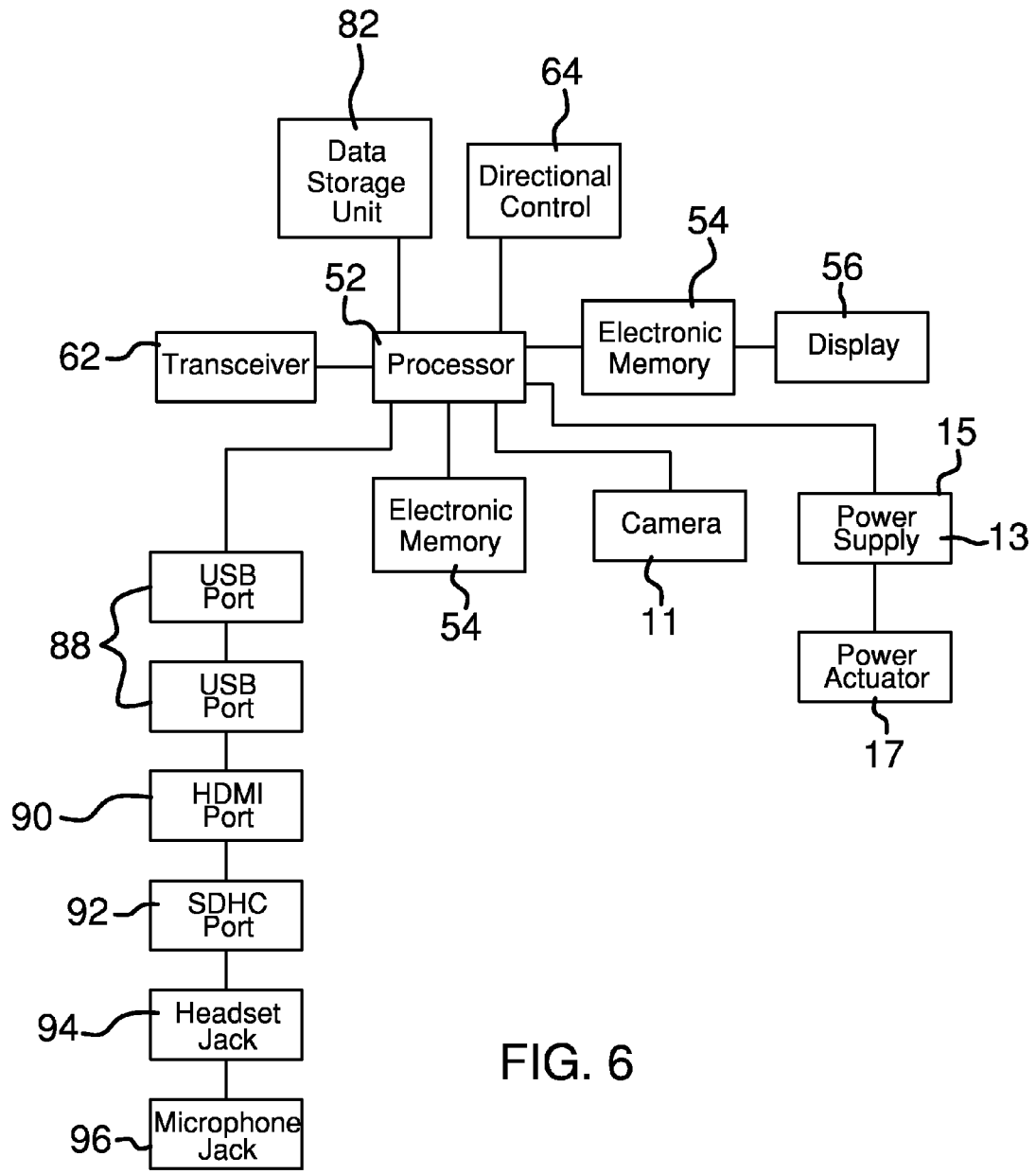
FIG. 6 is a schematic view of an embodiment of the disclosure.

As best illustrated in FIGS. 1 through 6, the flat display assembly 10 generally comprises a housing 12 that may be positioned on a support surface 14. The support surface 14 may be a tabletop of any conventional design. Continuing, the housing 12 has a width that is greater than a height of the housing 12. The housing 12 has a rectangular shape that may have a width between 25 cm and 30 cm, a height between 17 cm and 20 cm and a thickness between 2 cm and 4 cm.

A back side 16 of the housing 12 has a width that is less than a width of the front side 18 of the housing 12. Moreover, the housing 12 has a trapezoidal cross section taken perpendicular to a line extending between a top side 20 and a bottom side 22 of the housing 12. Lastly, the back side 16 of the housing 12 may have a width between 23 cm and 28 cm.

The housing 12 has a stand well 24 extending forwardly into the back side 16 of the housing 12. The stand well 24 may have a width between 20 cm and 25 cm, a height between 15 cm and 18 cm and a depth between 6 mm and 12 mm. Further, the stand well 24 extends from the bottom side 22 of the housing 12 toward the top side 20 of the housing 12.

A stand 26 is operationally coupled to the housing 12. The stand 26 comprises a pair of first longitudinal arms 28 of the stand extending between each of a pair of first lateral arms 30 of the stand 26. Moreover, the pair of first longitudinal arms 28 of the stand 26 are each spaced inwardly from each of an associated one of a first end 32 and a second end 34 of each of the first lateral arms 30 of the stand 26. Additionally, the stand 26 has a rectangular shape that may have a width between 18 cm and 22 cm and a height between 12 cm and 16 cm.

A top one of the pair of first lateral arms 36 of the stand 26 is movably coupled to the housing 12. A pair of rods 38 extends between an associated one of the first 32 and second 34 ends of the top first lateral arm 36 and an associated one of a first lateral edge 40 and a second lateral edge 42 of the stand well 24. The pair of rods 38 retains the stand 26 on the housing 12 so the stand 26 is positioned within the stand well 24.

A pair of second longitudinal arms 44 of the stand 26 extends between each of the pair of first lateral arms 30 of the stand 26. The pair of second longitudinal arms 44 of the stand 26 are spaced inwardly from an associated one of the pair of first lateral arms 30 of the stand. Additionally, the pair of second longitudinal arms 44 of the stand 26 are each evenly distributed between a center 46 of the stand 26 and the associated one of the pair of first longitudinal arms 28 of the stand 26.

A pair of second lateral arms 48 of the stand 26 extend between each of the pair of first longitudinal arms 28 of the stand 26. The pair of second lateral arms 48 of the stand 26 are spaced inwardly from an associated one of the pair of first lateral arms 30 of the stand 26. Additionally, the pair of second lateral arms 48 of the stand 26 are each positioned closer to the associated one of the pair of first lateral arms 30 of the stand 26 than the center 46 of the stand 26. Continuing, the stand 26 is positionable on the support surface 14 so a bottom one of the first lateral arms 50 of the housing 12 abuts the support surface 14. The stand 26 retains the housing 12 in an upright position.

A processor 52 is coupled to the housing 12. The processor 52 may be an electronic processor of any conventional design and may have a clock speed between 3.4 GHz and 3.5 GHz. An electronic memory 54 coupled to the housing 12. The electronic memory 54 is electrically coupled to the processor 52. Lastly, the electronic memory 54 may comprise RAM memory of any conventional design and may have a storage capacity between 4 GB and 8 GB.

A display 56 is coupled to the front side 18 of the housing 12 so the display 56 is accessible to a user 58. The display 56 is electrically coupled to the processor 52. Moreover, the display 56 may be an HD LCD display of any conventional design. Lastly, the display 56 may have a width between 20 cm and 22 cm and a height between 12 cm and 15 cm.

A video processor 60 is coupled to the housing 12. Further, the video processor 60 is electrically coupled between the processor 52 and the display 56. The video processor 60 may be a video card of any conventional design and may have a data capacity between 1 GB and 2 GB. Lastly, the video processor 60 renders the artistic visual effects displayed on the display 56.

A transceiver 62 is coupled to the housing 12. The transceiver 62 is electrically coupled to the processor 52. Moreover, the transceiver 62 may be an RF transceiver of any conventional design. The transceiver 62 is placed in selective electromagnetic communication with an external electronic device. Lastly, the transceiver 62 may utilize a Wireless Personal Access Network signal.

A directional control 64 is coupled to the front side 18 of the housing 12 proximate an intersection of the top side 20 and a first lateral side 66 of the housing 12. The directional control 64 is electrically coupled to the processor 52. Moreover, the directional control 64 controls a cursor on the display 56. The directional control 64 has a circular shape.

Indicia 68 is printed on a front side 70 of the directional control 64. The indicia 68 comprise a plurality of arrows 72. Each of the plurality of arrows 72 corresponds to an up direction, a down direction, a left direction and a right direction of the cursor on the display 56. The user 58 presses a selected one of the plurality of arrows 72 that corresponds to the desired movement of the cursor on the display 56.

An actuator 74 is coupled to the front side 18 of the housing 12 proximate the first lateral side 66 of the housing 12. The actuator 74 is electrically coupled to the processor 52. Moreover, the actuator 74 is one of a plurality of the actuators 74. Each of the plurality of actuators 74 corresponds to an associated command related to graphic design.

A speaker 76 is coupled to the front side 18 of the housing 12 proximate the top side 20 of the housing 12. The speaker 76 is electrically coupled to the processor 52. Moreover, the speaker 76 emits an audible sound. The speaker 76 is one of a pair of the speakers 76 each positioned proximate an associated one of a first lateral edge 78 and a second lateral edge 80 of the display 56. Lastly, the pair of speakers 76 may each be an audio speaker of any conventional design.

A pair of speaker actuators 73 is coupled to a back side 16 of the housing 12. Each of the pair of speaker actuators 73 is positioned proximate an intersection of the top side 20 of the housing 12 and an associated one of the first lateral side 66 and a second lateral side 75 of the housing. The pair of speakers actuators 73 are each electrically coupled to the processor 52. An up one of the pair of speaker actuators 77 increases a volume of the pair of speakers 76. A down one of the pair of speaker actuators 79 decreases the volume of the pair of speakers 76.

A data storage unit 82 is coupled to the housing 12. The data storage unit 82 is electrically coupled to the processor 52. Additionally, the data storage unit 82 may be a hard drive of any conventional design. The data storage unit 82 may have a storage capacity between 360 GB and 512 GB. Finally, the data storage unit 82 may contain a variety of programs related to the creation and manipulation of the artistic visual effects.

A port 84 is coupled to the housing 12. Further, the port 84 is positioned on a second lateral side 86 of the housing 12. The port 84 is electrically coupled to the processor 52. Lastly, the port 84 is selectively electrically coupled to the external electronic device.

The port 84 is one of a plurality of the ports 84. The plurality of ports 84 are distributed between the top 20 and bottom 22 sides of the housing 12. The plurality of ports 84 may comprise a pair of USB ports 88, an HDMI port 90, and SDHC port 92, a headset jack 94 and a microphone jack 96.

A stylus 98 is provided. The stylus 98 may be gripped by the user 58. Moreover, the user 58 writes on the display 56 with the stylus 98. The user 58 creates the artistic visual effects with the stylus 98. Additionally, the stylus 98 may have an appearance of a pen of any conventional design.

The top side 20 of the housing 12 has a stylus well 19 extending downwardly therein. The stylus well 19 is positioned proximate the first lateral side 66 of the housing 12. The stylus well 19 insertably receives the stylus 98. Moreover, the stylus well 19 stores the stylus 98 when the stylus 98 is not being used.

A camera 11 is coupled to the front side 18 of the housing 12. The camera 11 is positioned between each of the pair of speakers 76. Moreover, the camera 11 is electrically coupled to the processor 52. The camera 11 selectively captures images or streaming video. Lastly, the camera 11 may be a digital Web Cam of any conventional design.

A power supply 13 is coupled to the housing 12. The power supply 13 is electrically coupled to the processor 52. Further, the power supply 13 comprises at least one battery 15. A power actuator 17 is coupled to the top side 20 of the housing 12. The power actuator 17 is electrically coupled to the power supply 13. Finally, the power actuator 17 selectively actuates and de-actuates the power supply 13.

In use, the user 58 uses the stylus 96 to draw on the display 56. The stylus 96 creates and manipulates the artistic visual effects. The software on the data storage unit 82 allows the manipulation of the artistic visual effects in either 2D or 3D. Additionally, the transceiver 62 selectively communicates the artistic visual effects to the external electronic device for additional rendering or manipulation.

With respect to the above description, it is to be realized that the optimum dimensional relationship for the various components of the flat display assembly 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the flat display assembly 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A flat display assembly for producing artistic visual effects using a stylus, said assembly comprising:
   a housing configured to be positioned on a support surface;
   a stand operationally coupled to said housing, said stand being positionable on the support surface wherein said housing is retained in an upright position;
   a processor coupled to said housing;
   an electronic memory coupled to said housing, said electronic memory being operationally coupled to said processor;
   a display coupled to said housing wherein said display is accessible to a user, said display being operationally coupled to said processor;
   a directional control coupled to said housing, said directional control being operationally coupled to said processor, said directional control controlling a cursor on said display;
   an actuator coupled to said housing, said actuator being operationally coupled to said processor;
   a speaker coupled to said housing, said speaker being operationally coupled to said processor wherein said speaker emits an audible sound; and
   a stylus configured to be gripped by a user wherein the user writes on said display with said stylus wherein the user creates the artistic visual effects;
   wherein said housing having a width being greater than a height of said housing wherein said housing has a rectangular shape; said housing having a stand well extending forwardly into a back side of said housing; said stand comprising a pair of first longitudinal arms of said stand extending between each of a pair of first lateral arms of said stand wherein said stand has a rectangular shape; a top one of said pair of first longitudinal arms of said stand being movably coupled to said housing wherein said stand is positioned within said stand well; a pair of second longitudinal arms of said stand extending between each of a pair of first lateral arms of said stand wherein said pair of second longitudinal arms of said stand are spaced inwardly from an associated one of a pair of first longitudinal arms of said stand; a pair of second lateral arms of said stand extending between each of said pair of first longitudinal arms of said stand wherein said pair of second lateral arms of said stand are spaced inwardly from an associated one of said pair of first lateral arms of said stand;
   wherein said electronic memory being electrically coupled to said processor; said display being coupled to a front side of said housing; said display being electrically coupled to said housing; said directional control being coupled to said front side of said housing proximate an intersection of a top side and a first lateral side of said housing; said directional control being electrically coupled to said processor;
   wherein a camera coupled to a front side of said housing wherein said camera is positioned between each of a pair of said speakers; said camera being electrically coupled to said processor; a power supply coupled to said housing; said power supply being electrically coupled to said processor; said power supply comprising at least one battery.

2. The assembly according to claim 1 wherein said actuator being coupled to a front side of said housing proximate a first lateral side of said housing; said actuator being electrically coupled to said processor; said actuator being one of a plurality of said actuators; said speaker being coupled to said front side of said housing proximate a top side of said housing; said speaker being electrically coupled to said processor; said speaker being one of a pair of said speakers each positioned proximate an associated one of a first lateral edge and a second lateral edge of said display.

* * * * *